Oct. 13, 1925.

G. T. RONK 1,556,960

EXCAVATING MACHINE

Filed Jan. 11, 1922

Inventor
George T. Ronk
by Orwig & Hague
Attys

Oct. 13, 1925.

G. T. RONK

EXCAVATING MACHINE

Filed Jan. 11, 1922   7 Sheets-Sheet 4

Inventor
George T Ronk
by Orwig & Bag, Att'ys

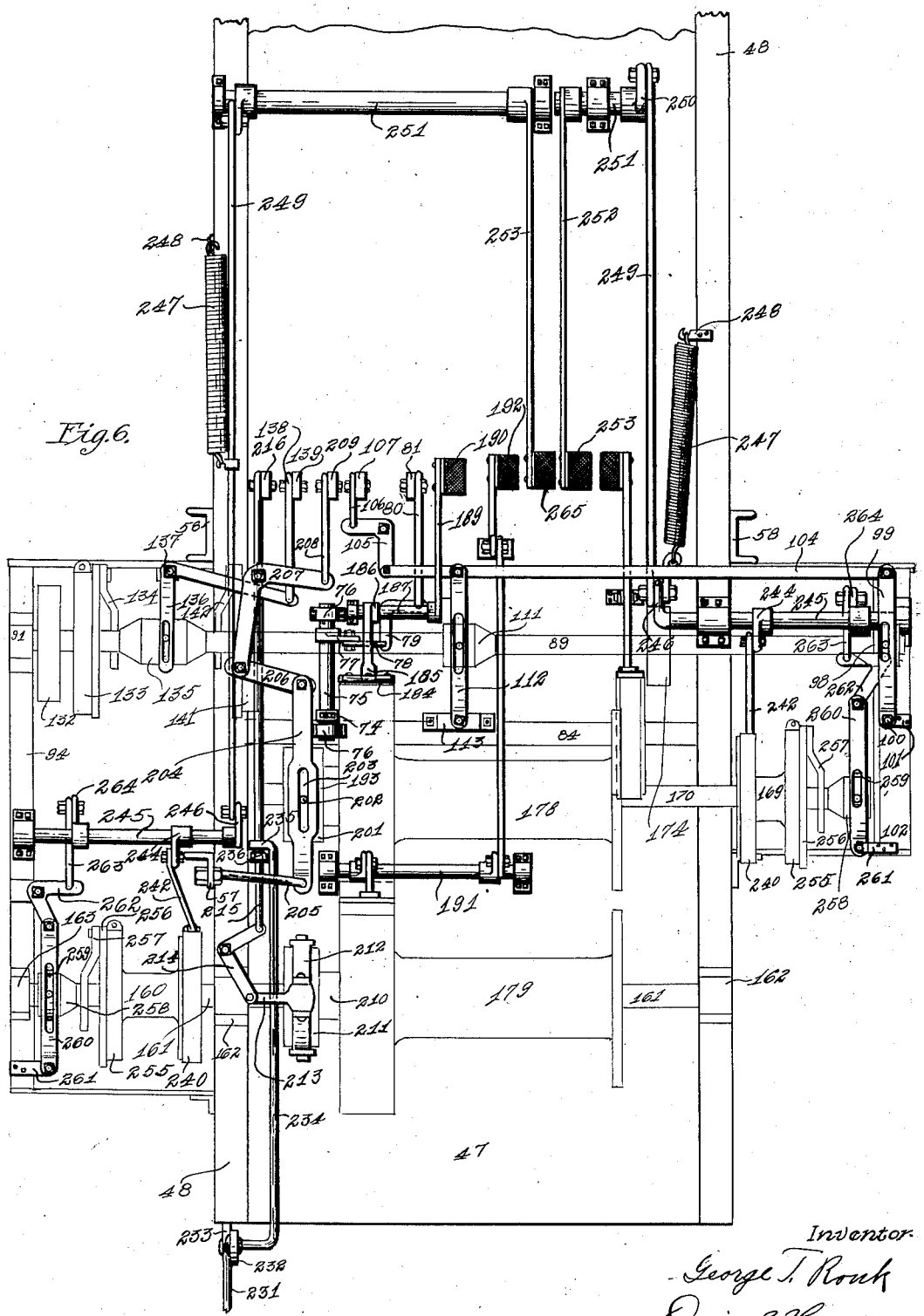

Oct. 13, 1925.
G. T. RONK
EXCAVATING MACHINE
Filed Jan. 11, 1922
1,556,960
7 Sheets-Sheet 6
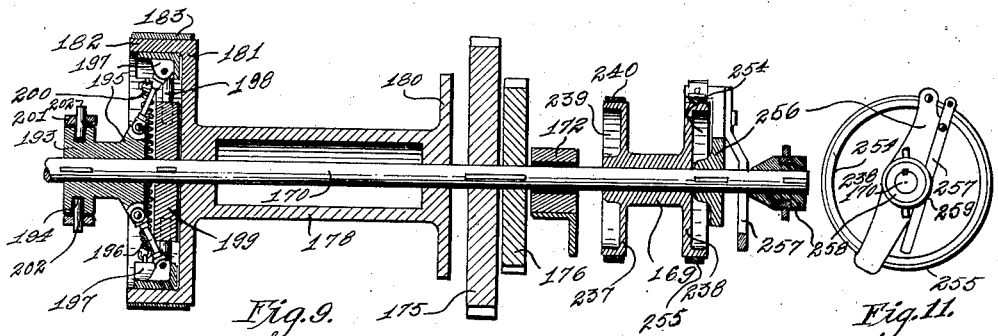
Fig. 9.   Fig. 11.
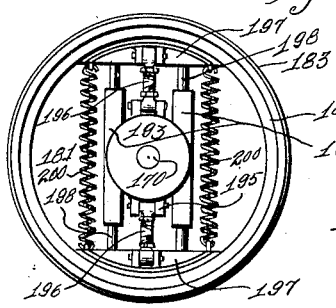
Fig. 10.
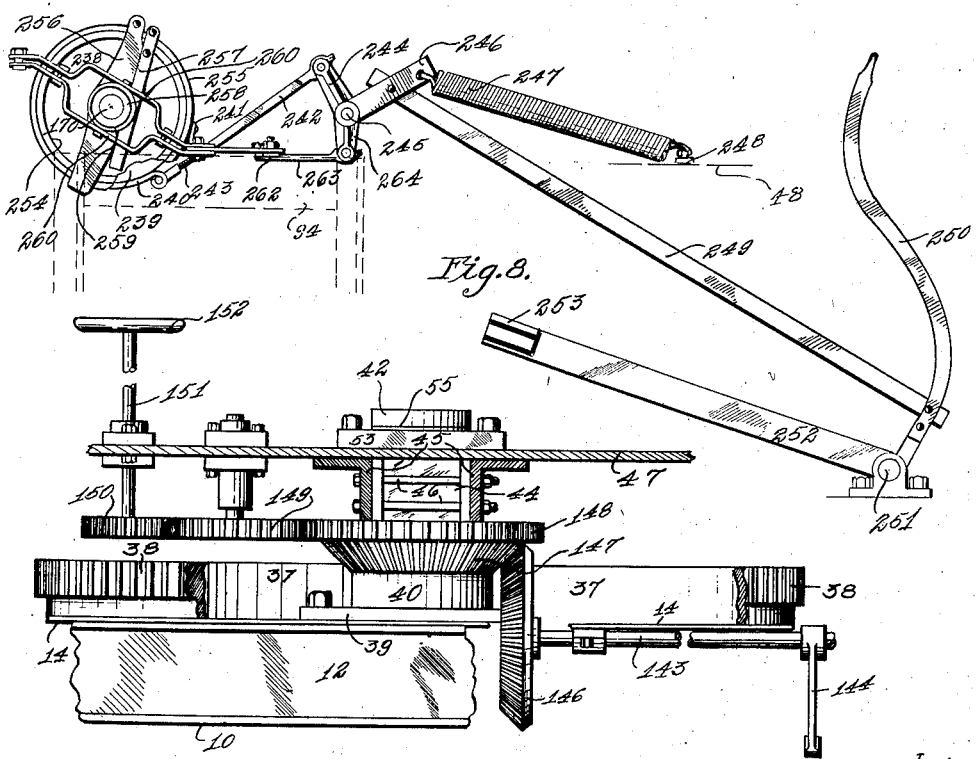
Fig. 8.
Fig. 7.
Inventor
George T. Ronk
by Orwig & Hague
Attys

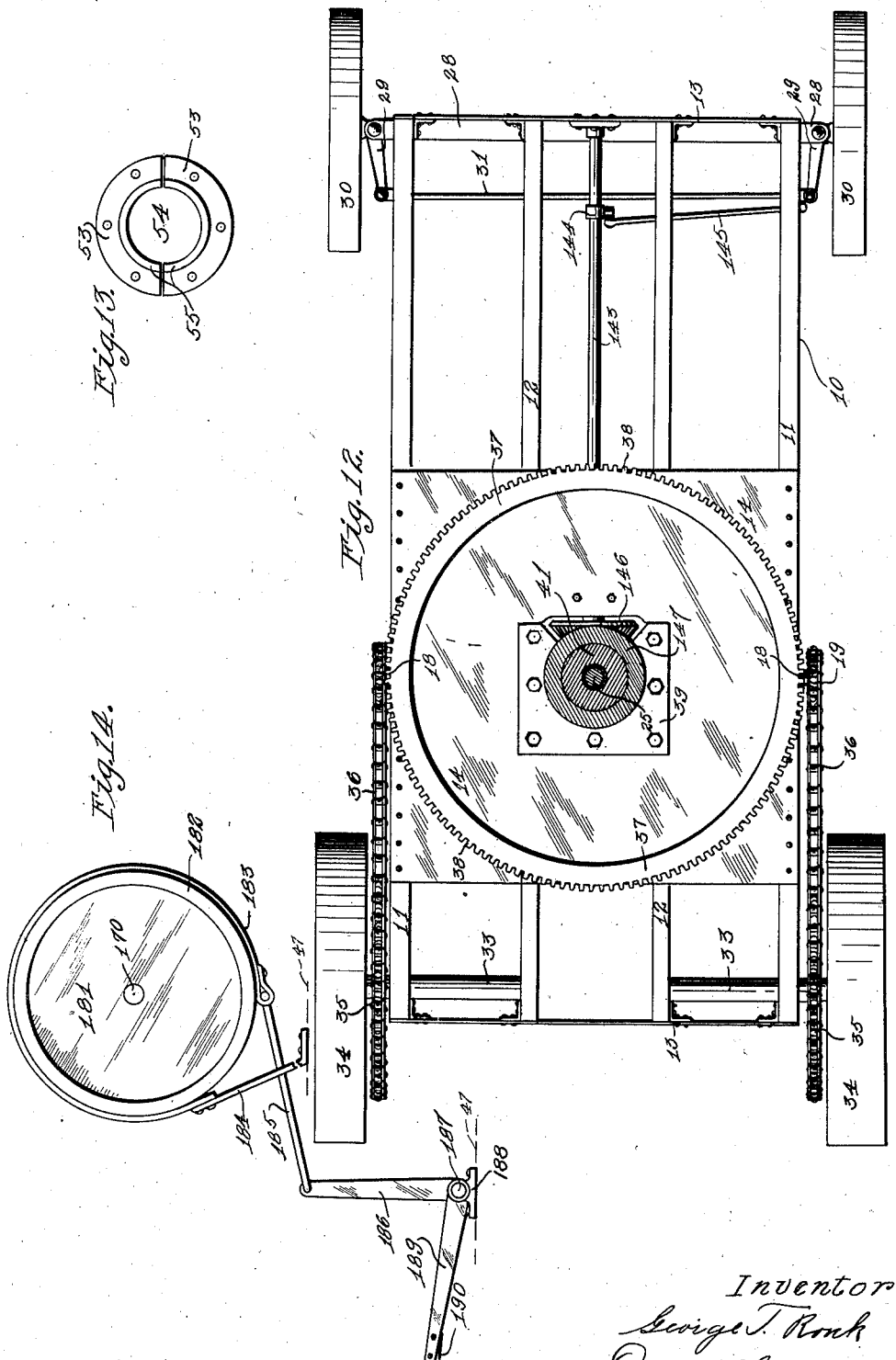

Patented Oct. 13, 1925.

1,556,960

UNITED STATES PATENT OFFICE.

GEORGE T. RONK, OF LEON, IOWA.

EXCAVATING MACHINE.

Application filed January 11, 1922. Serial No. 528,587.

To all whom it may concern:

Be it known that I, GEORGE T. RONK, a citizen of the United States, and resident of Leon, in the county of Decatur and State of Iowa, have invented a certain new and useful Excavating Machine, of which the following is a specification.

This invention relates to improvements in excavating machines of the type which is adapted to excavate or hoist, deliver and dump material from a distance remote from the excavating machine containing the mechanism for operating the excavator.

A further object is to provide in connection with an excavating mechanism, a scoop so arranged and controlled by suitable cables that the said scoop may be mechanically operated and moved to a position remote from the main excavating machine, and may be automatically filled and then moved to the operating mechanism, after which it may be elevated and conveyed to a suitable point and then dumped.

A further object is to provide in an excavating machine having a scoop designed to be operated at a remote position from the mechanism by means of suitable cables, improved mechanism for controlling and handling the said scoop.

A further object is to provide in an excavating machine having a swinging frame adapted to carry machinery for controlling an excavating scoop rotatively mounted on an automotive truck and capable of being steered, improved mechanism for operating the steering mechanism of the truck when the said swinging frame is in any one of its positions of movement.

A further object is to provide in an excavating machine having mechanism mounted on a swinging frame adapted to carry devices for controlling an excavator bucket, said frame being rotatively mounted on an automotive truck driven by power derived from a prime mover mounted on the frame, improved mechanism for driving the said truck at a number of speeds when said prime mover is being operated and for operating said swinging frame in two directions from power derived from said prime mover, the last said mechanism being adapted to also operate the driving mechanism for said truck from said prime mover at a third speed, and also in a reverse direction.

These and other objects will be apparent to those skilled in the art.

My invention consists in the construction, arrangement, and combination of the various parts of the device, whereby the objects contemplated are attained, as hereinafter more fully set forth, pointed out in my claims and illustrated in the accompanying drawings, in which:

Figure 6 is a plan diagrammatical view showing in heavy lines the control devices for the various operating mechanisms of the excavator.

Figure 7 is an enlarged detail view showing the mechanism for operating the steering device.

Figure 8 is a detail view showing the mechanism for controlling one of the cable drums.

Figure 9 is a longitudinal sectional view through one of the elevating drums, and also one of the cable drums showing the manner in which they are mounted relative to each other and certain control mechanism.

Figure 10 is a detail end elevation of one of the clutch devices for controlling the elevating drums.

Figure 11 is an end elevation of the clutch for controlling the cable drum shown in Figure 9.

Figure 12 is a plan view of the truck on which my improved excavator is mounted.

Figure 13 is an enlarged detail view of a clamping collar for securing the swinging frame in position on its pivot.

Figure 14 is an enlarged detail view of the control devices for the brake of one of the hoisting drums.

The numeral 10 indicates the main frame of my device which is constructed preferably of channel iron members 11 and 12, arranged longitudinally and parallel to each other.

Figure 2:
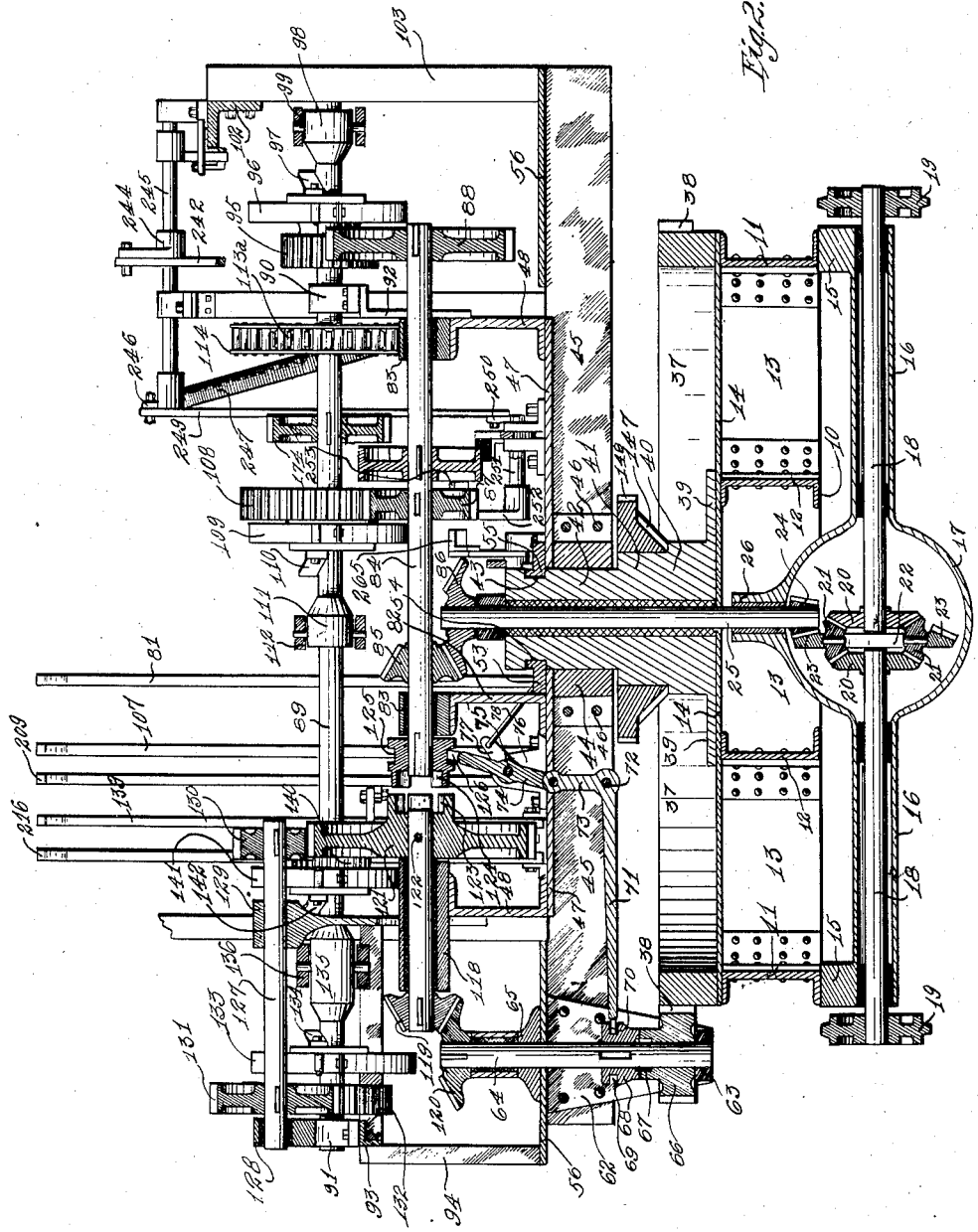
Figure 2 is a vertical transverse sectional view taken on the line 2—2 of Figure 1.

The ends of the members 11 and 12 are connected to transverse plates 13, shown in Figure 2. The members 12 are spaced apart and arranged in the central portion of the frame to form beams upon which a plate 14 is mounted, and other mechanism to be described.

Mounted beneath the central portion of the members 11, I have provided brackets 15 in which are mounted a casing 16, the said casing being provided at its central portion with a differential casing 17. Rotatively mounted in each end of the casing 16 is a shaft 18, the outer end of each shaft being provided with a sprocket wheel 19. The inner end of each of the shafts 18 is provided with a beveled gear 20, both of which are in operative relation with pinions 21 of a differential member 22.

This member 22 is provided with a beveled gear 23, which in turn is in mesh with a pinion 24 mounted on the lower end of a vertically arranged shaft 25, the said shaft being mounted in a bearing member 26 in the casing 17.

Mounted beneath the rear end of each of the members 11 I have provided a bracket 27. The lower ends of said brackets 27 rest on an axle member 28 which carries a pivoted bell crank member 29 in each end similar to those used in the ordinary auto steering mechanism. Each of the members 29 is provided with a wheel 30.

The arm portions of the members 29 are connected by means of a guide link 31. This link 31 provides means for steering the wheels 30, and is operated by means of mechanism as will hereinafter be described.

A bracket 32 is mounted beneath the front end of each of the members 11, said brackets being designed to carry a shaft 33, each end of which is provided with a rotatively mounted wheel 34. Each of the said wheels 34 is provided with a sprocket wheel 35 in line with the corresponding sprockets 19. Each corresponding set of sprockets 35 and 19 is designed to receive a chain 36. This provides means whereby the wheels 34 may be rotated by means of the shaft 25 and the coacting mechanism.

Mounted upon the plate 14, I have provided an annular track member 37. This member 37 is provided with a smooth upper face and has on its periphery a toothed rack 38, the member 37 being of a diameter substantially equal to the width of the frame 10.

Located on the top of the central portion of the members 12, I have provided a plate 39, best shown in Figure 2. This plate is provided with a centrally and vertically arranged bearing member 40 in which the shaft 25 is rotatively mounted. The member 40 is of a comparatively large diameter at its base portion, and is provided with offset bearing portions 41 and 42, the bearing portion 42 being of a less diameter than the bearing portion 41, and the bearing portion 42 having an annular groove 43 near its top end.

Figure 5:
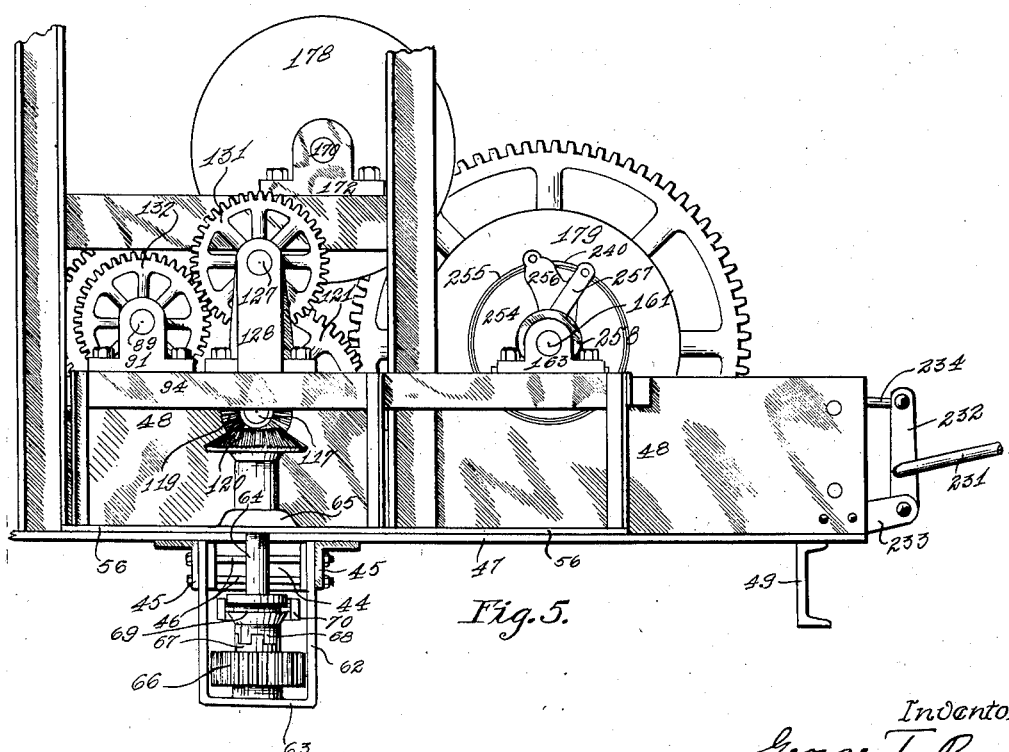
Figure 5 is an enlarged detail view showing in elevation the opposite side of the front of the said frame from that shown in Figure 4.

The bearing portion 42 is designed to receive a bearing block 44. This block 44 is designed to carry two parallel angle irons 45, shown in Figures 2, 5 and 7. This block is secured in position by means of suitable bolts 46 which run adjacent to the sides of said block 44 and between and through said angle irons 45 in such a manner that the block is firmly held in position. These members 45 form a portion of the swinging frame which includes a floor plate 47.

Mounted upon each of the outside edges of the plate 47 is a channel member 48 which are connected with each other by the said plate 47 and a series of transversely arranged channel members 49 at its forward end, and a number of angle iron members 50 at its rear end. These last said members are mounted beneath the plate 47 and parallel with the angle irons 45.

The weight of the swinging frame, which comprises the members 48 and the plate 47 together with the cross members 49 and 50, is carried by means of a series of brackets 51 secured to the lower side of the plate 47, arranged in a circular path vertically above the track members 37.

Each of the brackets 51 is designed to carry a roller 52 which coacts with and rests upon the smooth upper face of the track 37.

By this arrangement, it will be seen that I have provided a swinging frame, the weight of which is carried by the rollers 52, and which are designed to travel on the member 37 with the bearing member 42 serving as a pivot for the said frame. This swinging frame is adapted to swing through the full arc of a circle.

To prevent the swinging frame from being lifted vertically, I have provided a collar block 53 which is formed in two pieces and is designed to encircle the upper end of the bearing member 42 and provided with an opening 54 through which the upper end of the said member 42 is mounted.

The member 53 is provided with an inwardly extending annular flange 55, which is designed to enter the groove 43 of the member 42, the said collar block 53 being placed in position with the flange member 55 in the groove 43, after which the said collar is secured in position to the top face of the plate 47 by means of suitable bolts. This prevents the swinging frame from moving upwardly on the bearing 42 and held against downward movement by means of the rollers 52.

The outer end of the members 45, 49 and 50 extends beyond the members 48, and each set of corresponding ends is designed to carry a floor plate 56 on its upper surface.

Secured to the outside of the members 48, I have provided vertically arranged upright members 57, 58 and 59. The upper ends of of these said members are designed to carry a canopy 60, which is for the purpose of shading the operator, and also for protecting the mechanism, hereinafter to be described, against the action of the elements of the weather.

Diagonally arranged brace members 61 are provided, having their upper ends connected to the upper ends of the corresponding members 58, and their lower ends connected to the front ends of the members 48.

For moving the swinging frame in a circular path above the member 37, I have provided a bracket 62 mounted between the left hand ends of the members 45, as shown in Figure 2.

This bracket 62 is provided with two vertically arranged members, each of which is secured to the adjacent member 45 by means of suitable rivets. The lower ends of the said vertical members are provided with a connecting member 63, which is arranged horizontally and has its central portion provided with a rotatively mounted vertical shaft 64.

The upper end of the shaft 64 is mounted in a bearing 65 secured to the top of the plate 56. The lower end of the shaft 64 is provided with a pinion 66 which is loosely mounted just above the member 63, and is in mesh with the rack 38 of the member 37.

The upper end of the hub of the pinion 66 is provided with a clutch member 67. This clutch 67 is designed to be engaged by a coacting clutch member 68 which is feathered to the shaft 64.

The member 68 is provided with an annular groove 69 in which is operatively mounted a fork member 70 of a lever 71. This lever 71 is pivoted at 72, the said pivot 72 being mounted in one of the members 45. The said lever 71 is provided with an upwardly extending portion 73 which is pivotally connected to a lever 74.

This lever 74 is mounted on a horizontally and longitudinally arranged shaft 75 mounted in bearings 76 on the plate 47, shown in Figures 2 and 6. The back end of the shaft 75 is provided with an upwardly inclined arm 77 to which one end of a link 78 is pivotally connected. The opposite end of the link 78 is connected to one end of a bell crank lever 79. The opposite end of the bell crank lever 70 is provided with a link 80 which is pivotally connected to a vertically arranged lever 81.

By moving the upper end of the lever forwardly or rearwardly, the shaft 75 may be rocked through the links 78 and 80 and the bell crank lever 79. The rocking of the shaft 75 will cause the lower end of the arm 74 to be oscillated. This in turn will cause the fork end of the lever 71 to be elevated or lowered, thereby providing means whereby the clutch 68 may be moved into or out of engagement with the clutch 67, and the swinging frame moved about the pivot member 42, when so desired, by the pinion 66 being driven from the shaft 64, which will cause the said pinion to travel around the rack 38.

For driving the shafts 25 and 64, I have provided the following mechanism:

Mounted longitudinally between the members 48, I have provided a short channel member 82. The member 82 and the right hand member 48, as shown in Figure 2, are each provided with a bearing 83. These bearings are provided with a rotatively mounted shaft 84. This shaft 84 carries a beveled pinion 85 which is designed to mesh with a beveled pinion 86 on the upper end of the shaft 25.

The central portion of the shaft 84 carries a spur pinion 87, and the outer end of the said shaft is provided with a spur gear 88. The mechanism being described may also be seen in Figure 3.

Back of the shaft 84, I have provided a shaft 89 mounted in bearings 90 and 91, the bearing 90 being secured on the top of an angle plate 92 which is secured to the plate 48, and the bearing 91 being mounted on an angle 93 secured to a frame member 94 on the left hand side of the plate 56.

This shaft 89 is provided with a pinion gear 95, which is in mesh with the gear 88, the said pinion 95 is driven by means of a friction clutch device 96. This clutch device is provided with a pivoted lever 97 which may be actuated by means of a cone 98 slidably mounted on the shaft 89. Details of a similar clutch may be seen in Figures 9 and 11, a description of which will hereinafter be made. The cone 98 is provided with a lever 99, best shown in Figure 6.

One end of the lever 99 is pivoted by means of a bolt 100 secured in a bracket 101 mounted on a bar 102 of the swinging frame. This bar 102 is secured in position by upright angles 103 secured to the right hand plate 56. The opposite end of the lever 99 is provided with a transversely arranged link 104, the inner end of which is pivoted to a bell crank lever 105. This bell crank lever has a link 106 which is pivotally connected to a vertically arranged lever 107.

Thus it will be seen that by moving the lever 107 forwardly or rearwardly, the cone 98 may be moved longitudinally with the shaft 89 and the pinion 95 thrown into and out of operative relation with the said shaft 89 through the friction clutch 96.

The central portion of the shaft 89 is also provided with a loosely mounted gear 108 which is in mesh with the pinion 87. This gear is operatively connected with the shaft 89 by means of a friction clutch 109 similar to the clutch 96, and provided with an operating lever 110, which is designed to be engaged by a sliding cone 111 which is operatively connected with a lever 112, one end of which is pivoted to a bracket 113 mounted on the plate 47, and the other end pivotally connected to the bar 104.

The cones 98 and 111 are arranged in a reverse manner on the shaft 89 so that when the bar 104 is moved in one direction, one of the gears 108 and 95 will be thrown into operative relation with the shaft, while the opposite one is thrown out of operation, and vice versa.

By this arrangement, it will be seen that by operating the lever 107 either forwardly or backwardly, the shaft 84 will be brought into operative relation with the shaft 89 and driven through one of the gears 108 and 95, these gears being of different diameters and of different speed ratio, their coacting gears will cause the shaft 84 to be rotated at one of two different speeds relative to the speed of the shaft 89.

Through this mechanism, it will be seen that the sprocket 19 may be driven at two different speeds by operating the lever 107 forwardly or backwardly. When the said lever 107 is in its vertical position, both sets of gears will be in inoperative position, and no motion will be imparted to the said sprockets 19.

Figure 1:
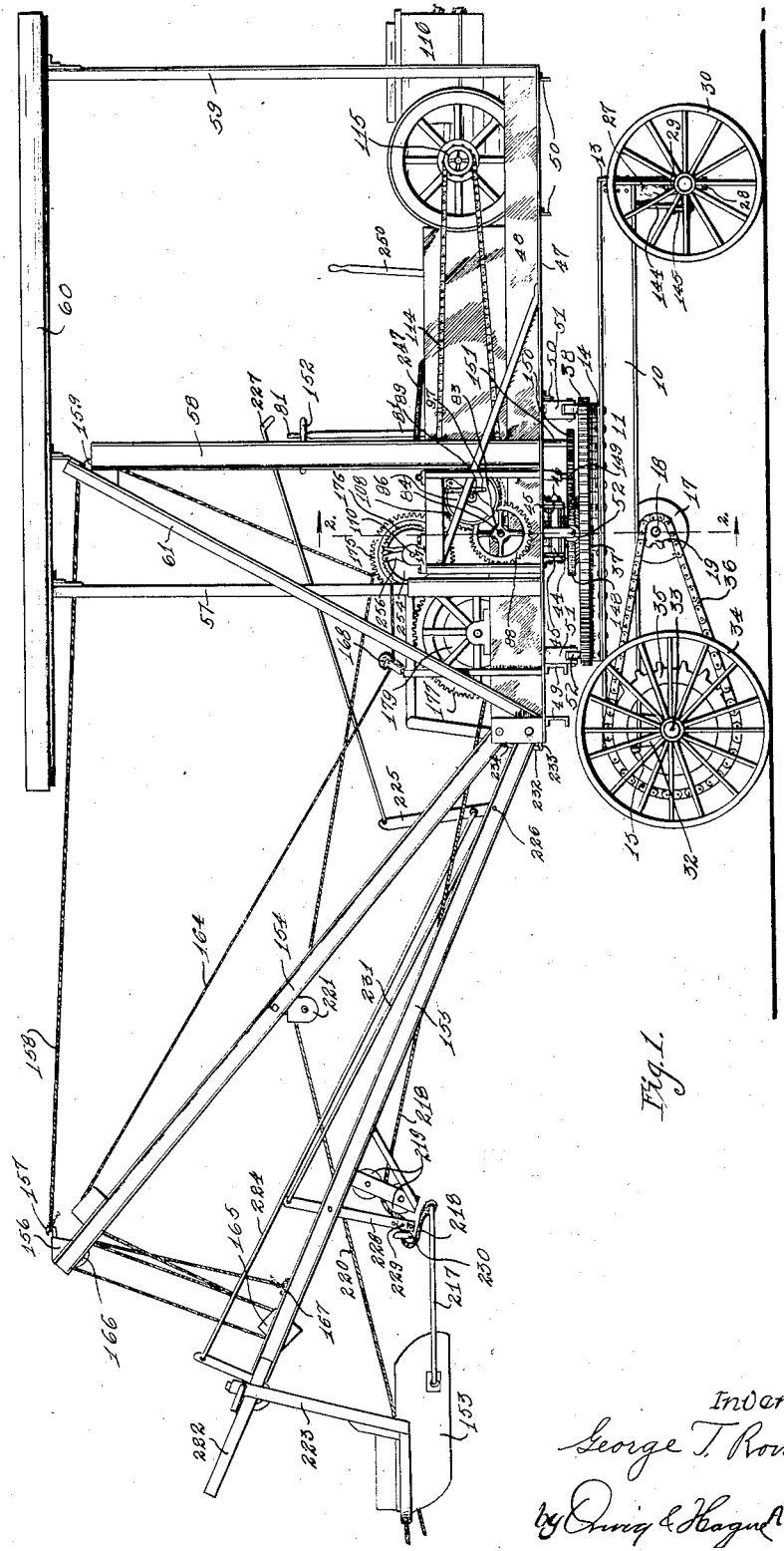
Figure 1 is a side elevation of my improved excavating machine.

For driving the shaft 89, I have provided a sprocket wheel 113ª which is designed to carry a chain 114, best shown in Figure 1, which is operated by means of a sprocket 115 on the shaft of an engine 116, or other prime mover. This engine is of the ordinary construction and needs not be described in detail. I have provided a friction clutch on the pinion 115 for throwing the machine into and out of operation relative to the engine.

In alinement with the shaft 84, I have provided a shaft 117 which is also in line with the shaft 64 and is mounted in a bearing 118 secured to the top of the left hand member 48.

The outer end of the shaft 117 is provided with a pinion 119 which is in mesh with a beveled gear 120. This beveled gear is secured to the upper end of the shaft 64. The inner end of the shaft 117 is provided with a spur gear 121 which is rigidly secured to the shaft 117 by means of a pin 122.

The hub of the gear 121 is provided with a clutch member 123 designed to be engaged by a clutch member 124 feathered to the inner member of the shaft 84. This clutch member 124 is provided with an annular groove 125 which is designed to be engaged by means of a fork 126 on the upper end of the lever 74, so that as the said lever 74 is operated to throw the clutch member 68 into engagement with the clutch member 67, the clutch member 124 will be thrown out of engagement with the clutch member 123 or vice versa. The purpose of this will hereinafter be made clear.

Arranged above the shaft 122, I have provided a shaft 127 mounted in bearings 128 and 129, the bearing 128 being mounted on the angle 93, while the bearing 129 is secured to the frame member 48.

The inner end of the shaft 127 is provided with a pinion 130 which is designed to mesh with the gear 121. The outer end of the said shaft 127 is provided with a gear 131, both of said gears being rigidly secured to the shaft.

The gear 131 is designed to mesh with a gear 132 loosely mounted on the left hand end of the shaft 89. This gear 132 is operatively connected with the shaft 89 by means of a friction clutch 133 having an operating arm 134, and designed to be actuated by means of a sliding cone member 135.

This cone member 135 is operated by means of a bell crank lever 136 pivoted to the frame by means of a shaft 137. The said bell crank 136 carries a link 138 which is pivoted to a vertical lever 139.

Thus it will be seen that by throwing the lever 139 forwardly or rearwardly, the gear 132 may be brought in operative relation with the gear 131 and driven through the said driving shaft 89.

By this arrangement, it will be seen that the shaft 64 may be driven from the shaft 89, and the swinging frame may be swung in one direction when the clutch 68 is in engagement with the clutch 67.

Figure 3:
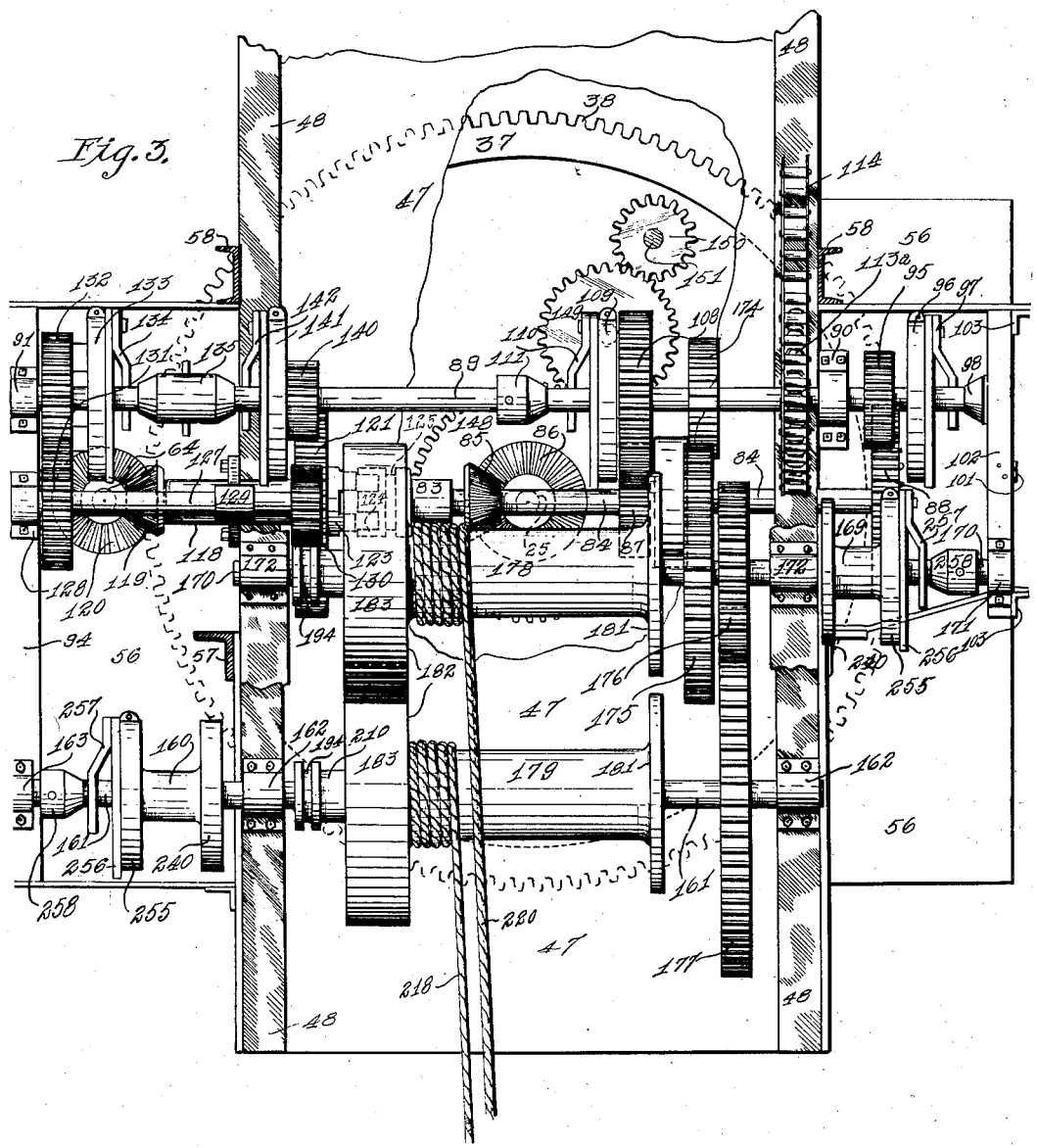
Figure 3 is an enlarged plan view of the front end of my improved excavating machine with the canopy and the various control devices removed, and portions of the frame members broken away to show certain mechanism.
Figure 4:
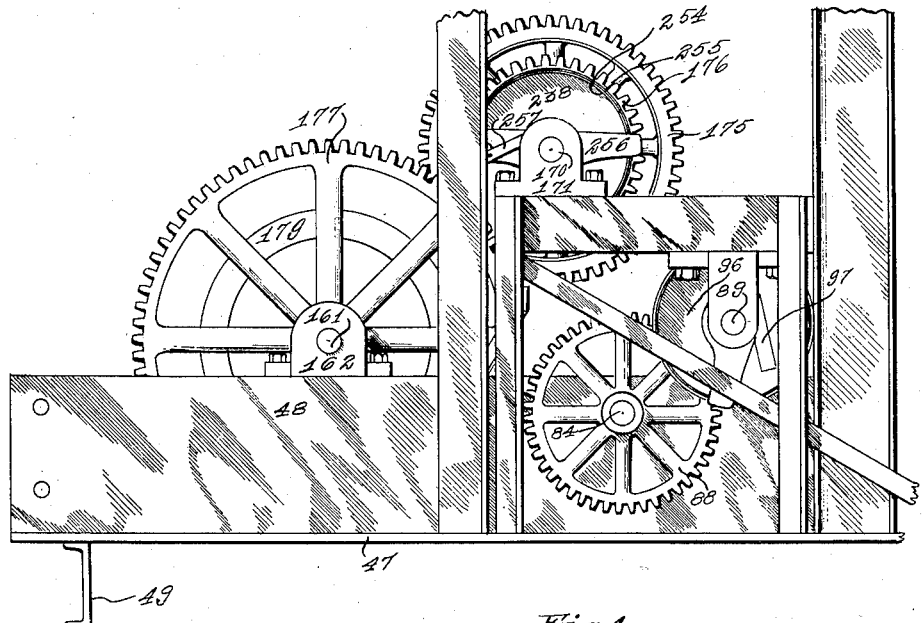
Figure 4 is an enlarged detail side elevation of a segment of the front end of the frame.

For reversing the direction of the swinging movement of said frame, I have provided a gear 140 which is loosely mounted on the shaft 89, and operatively controlled by means of friction clutch 141 having an operating arm 142 which is designed to also engage the cone member 135, when the said cone is slid in the opposite direction from that which it is moved to operate the lever 134. The pinion 140 is also in mesh with the gear 121. This will cause the said gear 121 to be driven in the opposite direction, when the cone 135 engages the lever 142, from that which it would be if the cone 135 engaged the lever 134. When the cone is in its neutral position, as shown in Figure 3, neither of the clutch devices 133 or 141 will be operated.

Thus it will be seen that by operating the lever 139, the swinging frame may be moved to any of its positions about the member 37 and in either direction. When the lever 107 is in its vertical position, no motion will be imparted to either of the shafts 122 or 84. When the lever 139 is operated in either direction, the shaft 117 will operate at a different speed from that which the shaft 84 would be caused to rotate by means of the gears 87 and 88.

Thus it will be seen that if the lever 139 is brought into an operative position of its movement, and the lever 81 is then actuated so that the clutch member 68 will disengage the clutch member 67, the clutch member 124 will be moved into engagement with the clutch member 123. This will cause the shaft 122 and the shaft 84 to operate in unison, and the sprocket wheels 19 to be driven at a speed different from either of the speeds produced by the operation of the lever 107.

By this arrangement, a reverse movement may be imparted to the sprockets 19 through the operation of the lever 139. When the clutch 124 has disengaged the clutch 123, the shaft 64 will be run idle and no swinging movement will be imparted to the swinging frame.

Thus, I have provided means whereby the gearing device which is for the purpose of swinging the said swinging frame may also be employed to produce a third forward speed for the drive mechanism of the truck.

The reverse mechanism for driving the said swinging frame may also be used to reverse the movement of the said truck. The other two speeds are arranged to produce the forward movement of the truck.

This arrangement saves a very large amount of machinery and thereby considerably simplified the construction of the machine and at the same time makes a very depreciative reduction in the cost of the construction of the same. It also eliminates several operating levers which makes the machine more simple to control.

By the mechanism just described, it will be seen that the truck may be advanced at three different speeds and reversed, and also that the swinging frame may be made to rotate to a complete circle about the member 37 in either direction, or any part of a circle.

For operating the steering mechanism of the truck, I have provided the following mechanism:

Arranged longitudinally in the back end of the frame 10, as shown in Figure 1, I have provided a shaft 143, the back end of which is provided with a downwardly extending arm 144, shown in Figures 1 and 12.

The lower end of the arm 144 is provided with a link 145 which is pivotally connected to the steering bar 31 so that as an oscillating movement is imparted to the shaft 143, the longitudinal movement will be imparted to the bar 31, and the wheels 30 steered in the usual manner.

The front end of the shaft 143 is provided with a beveled gear 146 which is designed to mesh with a beveled gear 147 loosely mounted on the bearing member 41 of the member 40 and beneath the swinging frame.

The beveled gear 147 is provided with a spur gear 148 formed integral. This gear 148 is in mesh with an idle gear 149 mounted on a vertical pivot secured to the plate 47. This idle gear 149 is in mesh with a pinion 150 mounted on the lower end of a vertically extending shaft 151, the upper end of the shaft 151 being provided with a hand wheel 152.

By this arrangement, it will be seen that as the hand wheel 152 is rotated, the shaft 151 will be rotated, and in turn the pinion 150, which will cause the gear 148 to be rotated through the idle gear 149, and consequently the beveled gears 146 and 147 will be rotated. This will cause the bar 31 to be operated as before described.

By this arrangement, it will be seen that the truck may be steered from the swinging frame regardless of what position of its movement the said frame may be at, as the gears 150 and 149 will merely travel around the gear 148 when the said swinging frame is rotated. This provides simple means for steering the truck at all times.

For controlling and handling an excavator scoop or bucket, such as is described in my copending application for patent on a scraper, filed January 25, 1921, Serial Number 439,855, and also patent issued jointly to Le Roy Kercher, Albert T. Ronk and myself, January 10, 1922, Number 1,403,418, on an excavating machine, I have provided the following mechanism:

The details of this bucket are disclosed in the first named application. My present application discloses a somewhat improved method of handling the said scoop. For controlling and handling the scoop, which is designated in the present application by the numeral 153, I have provided a lifting boom 154 pivotally mounted to the front end of the frame member 48, and a carrying boom 155.

The lifting boom 154 is provided with a plate 156 at its outer end which is designed to carry a hook 157. This hook 157 is provided with a cable 158 which extends rearwardly and passes over a pulley 159 secured to the super-structure of the swinging frame.

The said cable 158 is designed to be wound on a drum 160 mounted on a shaft 161, which extends transversely above the members 48, and is rotatively mounted in bearings 162 and 163.

The bearing 163 is mounted on the member 94, while the bearings 162 are mounted on the members 48, the said drum 160 being mounted between the members 48 and the members 94, as clearly shown in Figure 3.

The boom 155 is carried from the boom 154 by means of a cable 164, said cable including a block 165 in the boom 155 and a block 166 in the boom 154, one end of said cable is secured to the boom 154 by any suitable means at the point 167. The opposite end of the cable 164 extends rearwardly and downwardly beneath a guide pulley 168, and thence to a drum 169 mounted on a shaft 170.

This shaft 170 is mounted transversely above the members 48 and back of the shaft 161, and has its right hand end, as shown in Figures 3 and 6, extending beyond the right hand member 48 and mounted in a bearing 171 on the plate 102, and bearings 172 mounted on the members 48.

For driving the shafts 161 and 170, I have provided the following mechanism:

Mounted on the shaft 89, I have provided a pinion 174 which is rigidly secured to said shaft. This pinion 174 is in mesh with a gear 175 rigidly secured to the said shaft 170.

The said shaft 170 is also designed to carry a gear 176 which is in mesh with a gear 177 secured to the shaft 161, the gear 176 being considerably less in diameter than the gear 177 so that the shaft 161 may be rotated at a speed slower than the shaft 170.

The shaft 170 is provided with a drum 178, and the shaft 161 is provided with a drum 179. These drums are for the purpose of controlling the outhaul and the inhaul cables of the scoop. As both of them are exactly alike, but one of them will be described.

The drum 178 comprises a cylindrical portion having a flange 180 at one end and a flange 181 at the opposite end, the said flange 181 being provided with a laterally extending cylindrical flange or drum portion 182. This drum portion 182 is designed to receive a friction band 183, which is for the purpose of frictionally controlling the unwinding of the drum 178. The band 183 has one end secured to a stationary bracket 184 secured to the main frame, while the other end is connected to a link 185 which is pivotally connected to an upwardly extending arm 186.

This arm 186 is mounted on a shaft 187, being mounted in suitable bearings 188 secured to the floor plate 47. The said shaft 187 is provided with a rearwardly extending lever 189, the rear end of which is provided with a treadle 190.

By this arrangement, it will be seen that as the operator places his foot on the said treadle 190, the band 183 will be drawn tight on the drum 182. The drum 179 is provided with a similar control device 191 having a foot treadle 192.

The drum 178 is operatively connected with the shaft 170 by means of a friction clutch device which comprises a sleeve 193 slidably mounted on the said shaft and feathered thereto.

This sleeve 193 is provided with an annular groove 194 at one end, and with diametrically opposite lugs 195 at the opposite end. Each of these lugs is designed to carry a pivoted link 196, the free end of each of said links being provided with a shoe 197 which is designed to engage the inner face of the flange 182.

Each of the shoes 197 is provided with inwardly extending pins 198 which are slidably mounted in a block 199 secured to the shaft 170. The shoes 197 are yieldingly pulled toward each other by means of springs 200. The block 199 serves to provide a guide for the pins 198 and also for the purpose of applying the necessary power to the said shoes 197.

The links 196 are so arranged that as the sleeve 193 is moved longitudinally with the shaft 170, the shoes 197 will be moved into or out of engagement with the flange 182, thus providing means for frictionally connecting the drum 178 with the shaft 170, which is driven through the gear 175 and the pinion 174.

The sleeve 193 is provided with a collar 201 operatively mounted in the groove 194. This collar 201 is provided with pins 202, which are designed to enter slots 203 of a pivoted lever 204. One end of the said lever 204 is operatively connected to an adjustable rod 205 secured to one of the main frame members. The opposite end of the said lever 204 is provided with a pivoted link 206, one end of which is pivoted to a bell crank lever 207.

This bell crank lever 207 is provided with a link 208 which is pivotally connected with a vertically arranged lever 209. As the upper end of said lever 209 is moved forwardly or rearwardly, the sleeve 193 will be moved longitudinally with the shaft 170, and the shoe 197 caused to engage the flange 182.

The shaft 161 is provided with a sleeve 210 similar to the sleeve 193 of the shaft 170, the said sleeve 210 being designed to operate a clutch device similar to the one in the drum 178. This sleeve 210 is provided with a collar 211 and an operating lever 212, the said lever 212 being arranged vertically, while the lever 204 is arranged horizontally.

The upper end of the lever 212 is provided with a link 213 which is connected to a bell crank 214 pivotally mounted on the main frame. The said bell crank 214 is pivoted to a longitudinally arranged rod 215, the rear end of the rod 215 being pivoted to a vertically-arranged lever 216, and so arranged that as the upper end of the said lever is moved forwardly or rearwardly, the sleeve 210 will be moved longitudinally with the shaft 161, and the drum 179 thrown in operative or inoperative relation with the shaft 161.

By this arrangement, either of the drums 178 or 179 may be thrown into operation at the will of the operator by actuating the levers 216 or 209.

The scoop 153 is provided with a filling bail 217 to which is attached an inhaul cable 218. This cable passes between guide pulleys 219 secured to the carrying boom 155. The said cable 218 has its opposite end connected to the drum 179. The said drum and cable serve the purpose of drawing the scoop toward the boom 155.

The scoop 153 is drawn away from the said boom by means of an outhaul cable 220 which is designed to pass through a pulley block situated at a point remote from the machine where the excavating is to take place, as is clearly disclosed in my pending application above referred to.

This cable 220 passes through a block 221 secured to the central portion of the boom 154, and thence to the drum 178.

By this arrangement, if the drum 179 is operated, the scoop will be pulled toward the carrying boom, while if the drum 178 is operated, the scoop will be moved away from the said boom.

The boom 155 is provided with a guide arm 222 which is for the purpose of receiving a lifting bail 223 of the said scoop. A trip rod 224 is provided for the purpose of dumping the scoop. The manner in which this is accomplished is clearly described in said patent.

The rod 224 has its inner end connected to an upright pivoted lever 225, said lever being pivoted to the boom 155 by means of a pivot 226. The upper end of the lever 225 is provided with a rod 227 which extends rearwardly to a point where it is convenient for the operator to grasp it so that as he moves the said rod longitudinally, the scoop may be dumped.

For automatically throwing the drum 179 out of operation when the scoop 153 is being drawn inwardly, I have provided a lever 228 pivotally connected to the boom 155, having its lower end provided with a loop 229 through which the cable 218 passes.

The said cable 218 is provided with a knob 230 which is designed to engage the lower end of the said lever 228 and the scoop 153 when it has reached its inward limit of movement. The upper end of the lever 228 is provided with a rod 231, the lower end of which is pivotally connected to a lever 232, shown in Figure 5.

This lever 232 is pivoted to a bracket 233 secured to one of the main frame members 48. The upper end of the lever 232 is provided with a rod 234 which extends rearwardly and adjacent to the rod 215 for a short distance. The rod 234 is provided with a right angle portion 235 through which the rod 215 is slidably mounted.

A nut 236 is mounted on the shaft 215 and provides means against which the member 235 acts, and the rod 234 is moved forwardly as the knob 230 strikes the lower end of the lever 228. This forward movement causes the rod 215 to be moved forwardly and the bell crank 214 to be operated. This will cause the upper end of the lever 211 to be moved outwardly and the clutch of the drum 179 to be thrown out of operation with the said drum, thereby providing means for automatically throwing the said drum out of gear when the bail 223 of the scoop 153 is received on the arm 222.

The nut 236 may be moved forwardly to such a position that the said automatic mechanism will be thrown out of operation, if the operator so desires, as an experienced operator usually prefers to operate the excavator without this automatic device. The said automatic device is essential with amateur operators.

The carrying boom 155 is elevated and lowered after the bail 223 is in position on the bar 222 by operating the drum 169, which is designed to receive the cable 164. The operation of this drum is as follows:

Referring to Figure 9, the drum 169 is rotatively mounted on the shaft 170, and is provided with flanges 237 and 238. The flange 237 is provided with a drum 239 designed to receive a band brake 240, details of which are shown in Figure 8.

This band 240 is anchored at one end by means of a bracket 241, and has its opposite end provided with a pull rod 242, which includes a screw threaded adjustment 243. The upper end of the rod 242 is pivotally connected to a crank 244 mounted on a shaft 245.

The shaft 245 is provided with an arm 246, the upper end of which is provided with a spring 247, the said spring having one end connected to the frame member 48 by means of a hook 248.

This lever 246 is also provided with a link 249 pivotally connected to a lever 250. The lever 250 is connected to a rock shaft 251, which is provided with an arm 252, the free end of which is provided with a foot treadle 253, the spring 247 being so arranged that the band 240 will yieldingly engage the drum 239 with sufficient pressure so that the weight of the boom and the load which it carries will not unwind it.

When it is desired to permit the said boom to be unwound, the foot treadle 253 would be moved downwardly, which will cause the said band 240 to be released by the mechanism above described.

The flange 238 is provided with a drum 254 which is designed to receive a floating band 255. One end of this band 255 is connected to one end of an arm 256, which is rigidly secured to the shaft 170. The opposite end of the band 255 is pivotally connected to one end of the lever 257 which is pivoted to the arm 256.

The arm 257 is so arranged that it may be engaged by a cone 258 slidably mounted and feathered to the shaft 170 in such a manner that as the inner end of the lever 257 is moved outwardly from the center of the shaft, the other end of the said lever 257 will draw the band tight. This will cause the drum 254 to rotate in unison with the shaft 170, and the cable 164 to be wound up, which in turn will elevate the boom 155.

The cone 258 is provided with a collar 259 which is pivotally connected with a lever 260, as clearly shown in Figure 6. This lever 260 has one end pivoted to a bracket 261 secured to the main frame. The opposite end is pivotally connected to a bell crank 262, said bell crank being provided with a link 263 which is pivotally connected to a downwardly extending arm 264 mounted on the shaft 245.

The arms 244 and 264 are designed to extend in substantially opposite directions in such a manner that as one of them is actuated to move one of the brake bands in operative relation with its respective drum, the opposite brake band will be released.

By this arrangement, if the downward movement of the treadle 253 is continued after the band 240 has been released, the band 255 will be caused to engage its respective drum, which will cause the cable 164 of the said drum to be wound up. Upon releasing the said treadle 253, the said cable and the boom 155 will be retained in the position in which it has been elevated by the spring 247.

By this arrangement, the operator may very accurately and very quickly control the operation of the boom 155.

The drum 160 of the shaft 161 is controlled by a similar mechanism to that which the drum 169 is controlled, and is provided with a foot treadle 265, and I have applied the same numerals to this mechanism to designate similar parts.

All of the friction clutches before described are similar to the one just described, and the operating levers of the same being the same as the operating levers 257.

The clutches which are designed to operate the gears have the pinion gear secured to the hubs, similar to 169, in place of the disc 238.

The operation of my improved excavator has been pretty well disclosed with the description of its various mechanisms. The general operation is as follows:

Figure 1 shows the scoop in an elevated position after it has been loaded and received by the boom 155.

Assuming that it is desired for the operator to dump the dirt to the rear end of the machine or to a position at the right of the machine, as shown in Figure 1, the lever 81 is grasped, which is pulled rearwardly. This will cause the lever 74, shown in Figure 2, to be rocked in a clockwise direction by the shaft 75, which in turn will cause the upper end of the lever 73 to be moved in an anti-clockwise direction, and the clutch 68 made to engage the clutch member 67. The clutch 124 will be out of engagement with the clutch 123.

The lever 139 may then be grasped and moved in either direction, depending altogether in which direction it is desired to swing the scoop. The cone 135 will then be moved into engagement with either of the levers 134 or 142, and we will say with the lever 134. This will cause the pinion 132 to rotate the pinion 131, which in turn will cause the shaft 127 to be rotated, thence the pinion 130 and the gear 121, and the shaft 122, the pinion 119, the gear 120 and the shaft 64.

This in turn will operate the pinion 66 from the clutches 67 and 68, and this will cause the swinging frame to be moved about the member 37 until the scoop 153 has reached the desired position, after which the lever 39 may be moved to its neutral position and the rotation of the swinging frame stopped.

The scoop may be returned by moving the lever 139 in the opposite direction to which it was first moved. This will cause the cone to engage the lever 132 and the clutch 141 operating the pinion 140.

This pinion 140 is also in engagement with the gear 121. This will cause the gear to be rotated in the opposite direction from that which it was rotated by the pinion 130.

When the scoop has reached its dumping position, the rod 227 may be pulled rearwardly and the scoop dumped as described in my copending application on an excavator bucket.

The boom may be lowered by operating the foot treadle 253, as before described. The drum 178 may then be set into operation by means of the lever 209 until the scoop has reached its filling position, after which the drum 179 will then be placed into operation by means of the lever 216.

By manipulation of the various devices, as before described, the wheels 34 may be driven and the excavator advanced from one point to another, and at a number of different speeds, a portion of the mechanism for moving the swinging frame being employed to reverse and to produce one of said forward speeds. The device may be steered when the swinging frame is in any of its positions of movement, as before described.

By this arrangement, it will be seen that I have provided an excavating machine which is adapted to operate a scoop in such a manner that the said scoop may be mechanically moved to a distance from the machine, then filled by mechanism in said excavator, then drawn forwardly to engage the carrying boom, after which it may be moved to any position as it is desired to dump.

When the swinging frame is being moved, and the scoop 153 carried by said frame, the brake band of the drum 178 may be released to permit the cable 220 to play out. As the scoop is returned to a position where it engages and disengages the carrying boom, the drum will have to be operated to wind up the cable 220.

By the mechanism before described, all of these operations may be easily and quickly taken care of by a single operator, as he has absolute control of the scoop either when filling, dumping or otherwise.

By this construction, a man for holding the scoop is also eliminated. The scoop 153 may be loaded and the truck may be advanced to carry the load to a certain distance before dumping, if so desired.

I claim as my invention:

1. A main frame, supporting wheels for said frame, means for driving one set of said supporting wheels, a supporting frame pivotally mounted on said main frame, a prime mover on said supporting frame, means interposed between said prime mover and the driving mechanism for said wheels for advancing said main frame at a number of different speeds, an excavating scoop carried by said supporting frame, means actuated by said prime mover for moving said scoop from a filling position to an elevated position, means actuated by said prime mover for swinging said supporting frame on said main frame in either direction, and means for throwing the last said means in operative relation with said driving means whereby the said main frame may be advanced at speeds different from that produced by the first driving means, and for the purpose of reversing said driving means.

2. A wheel supported truck, driving means for advancing said wheel supported truck, a supporting frame pivoted for rotation on said truck, a prime mover on said supporting frame, means operated from said prime mover for swinging said supporting frame in either direction, means for throwing the last said means into operation with said driving means whereby said main truck may be advanced in either direction at a speed different from that produced by the first said driving means.

3. A wheel supported truck, driving means for advancing said wheel supported truck, a supporting frame pivoted for rotation on said truck, a prime mover on said supporting frame, means operated from said prime mover for swinging said supporting frame in either direction, means for throwing the last said means into operation with said driving means whereby said main frame may be advanced in either direction at a speed different from that produced by the first said driving means, and means mounted on said supporting frame for steering said main frame when said supporting frame is in any of its pivoted positions of movement.

4. An excavator frame, a prime mover on said excavator frame, a boom pivotally mounted on said excavator frame, means operated by said prime mover for raising and lowering the free end of said boom, a scoop, an outhaul cable device for moving said scoop from and beyond said boom, and an inhaul cable for moving said scoop toward said boom, means connected with said prime mover for operating the outhaul cable, and means connected with said prime mover for operating said inhaul cable, the scoop being designed to engage said boom when its free end is at its lower position of movement, and to be carried thereby when it is in its elevated position of its movement, and means for automatically throwing the means which control the inhaul cable out of operative relation with said prime mover when the said scoop has engaged said boom.

5. A wheel supported base, means for steering one set of the wheels of said base, an annular track on said frame, a pivoted member centrally located within said track and provided with step bearings, a gear rotatively mounted on one of the bearings of said pivot, said gear including a spur gear and a beveled gear, a rock shaft mounted in said base operatively connected with said steering mechanism so the steering mechanism will be operated as the said shaft is rocked, a beveled gear for rocking said shaft operatively connected with the beveled gear of said pivot, a frame pivotally mounted on the other bearing of said pivot, said frame including roller devices for engaging said annular track, means for swinging said frame about said pivot center, a shaft pivotally mounted in said main frame, a hand wheel on said shaft, a spur gear on said shaft in mesh with the spur gear of said pivot member.

6. A wheel supported base, means for driving one set of wheels of said base, a track on said base, said track being provided with an annular gear, a pivoted supporting frame for rotation above said track, said frame being provided with rollers for engaging said track, a prime mover on said frame, a driving shaft on said frame, means for operatively connecting said driving shaft to said prime mover, a counter shaft, means for operatively connecting said driving shaft and said counter shaft, said means being designed to drive said counter shaft at a number of different speeds, means for operatively connecting said counter shaft and the driving means of said wheel supporting base, a third shaft in alinement with said counter shaft and adjacent thereto, means operated from said third shaft for driving a vertical shaft rotatively mounted in said frame, a pinion on said vertical shaft in mesh with the gear of said annular track, a clutch for throwing said pinion into and out of operation with said vertical shaft, a clutch device for throwing said counter shaft into operative relation with said third shaft when the said pinion of said vertical shaft is out of operation therewith, means for simultaneously controlling said clutches, means actuated by said driving shaft for driving said third shaft in either direction.

7. A wheel supported base, means for driving one set of the wheels of said base, a pivoted supporting frame for rotation on said base, a prime mover on said frame, a driving shaft mounted on said frame, means for operatively connecting said driving shaft and said prime mover, a counter shaft operatively connected with the driving mechanism of said base, a pair of power transmitting devices for driving said counter shaft and said driving shaft, said power transmitting devices having different speed ratios, means for throwing either of said power transmitting devices into or out of gear, a third shaft in alinement with said counter shaft, means operated from said third shaft for causing the said frame to be rotated on said base, means for throwing said rotating means into and out of operation with said third shaft, means for simultaneously operating the last said means and the clutch connecting the counter shaft and said third shaft so that when one clutch is in operative position, the other will be in an inoperative position, means for driving said third shaft in either direction from said driving shaft and at a speed different from either of the said speeds of said counter shaft, means for throwing the last said means into and out of operation with said driving shaft.

8. A wheel supported base, means for driving one set of said wheels of said base, a pivoted supporting frame mounted for rotation relative to said base, a prime mover on said supporting frame, a driving shaft, means for operatively connecting said prime mover and said driving shaft, a counter shaft, means operatively connected with said counter shaft for operating the driving mechanism of said wheels, means for driving said counter shaft from said driving shaft at a number of different speeds, means for throwing the last said means into and out of gear, a third shaft, means driven by said third shaft for imparting a rotary movement to said supporting frame relative to said base, means operated from said driving shaft for imparting motion to said third shaft in either direction and at a speed different from either of the speeds of said counter shaft, means for throwing the last said means into and out of operative relation with said driving shaft, means for throwing said counter shaft and said third shaft into and out of operative relation with each other.

9. A base, an axle for supporting one end of said base, wheels loosely mounted on said axle, a set of steering wheels at the opposite end of said base, a pair of horizontally arranged counter shafts, said counter shafts including a differential each of said counter shafts being provided with means for imparting rotary motion to a corresponding wheel on said axle, a vertical shaft rotatively supported to drive said differential, said vertical shaft being mounted in a pivot member on said base, a frame rotatively mounted on said pivot member, an annular gear supported on said base concentric with said pivot member, a vertical shaft rotatively mounted in said frame, a pinion rotatively mounted on said vertical shaft designed to engage the annular gear, a clutch for throwing said pinion into and out of operation with said vertical shaft, a prime mover on said frame, a horizontally arranged driving shaft, means for operatively connecting said prime moved and said driving shaft, a counter shaft parallel with said driving shaft, gear devices for operatively connecting said counter shaft and said vertically pivoted shaft, a second counter shaft in line with said first counter shaft, gear devices for operatively connecting said second counter shaft with said vertical shaft, a gear for said second counter shaft, a third counter shaft parallel with said second counter shaft, gear devices for operatively connecting said driving shaft and said third counter shaft at an opposite direction to said driving shaft and at the same speed, means for throwing said gear devices into and out of operative relation with said driving shaft, a pinion on said third driving shaft in operative relation with the gear on said second counter shaft so arranged that said second counter shaft will be driven at a slower rate of speed than the third counter shaft, a pinion loosely mounted on said driving shaft in mesh with the gear on said second counter shaft of the same diameter as the corresponding pinion on said third counter shaft, means for throwing said loosely mounted pinion into and out of operation with said driving shaft, a clutch device for throwing said first counter shaft and said second counter shaft into operative relation with each other, means for causing the clutch device of the vertical shaft to engage its coacting pinion, a gear and a pinion fixed to said first counter shaft, a corresponding gear and pinion loosely mounted on said driving shaft, and means for throwing either of the last said gear and pinion into and out of operative relation with said driving shaft.

10. A supporting frame, a lifting boom pivoted to said frame, a carrying boom pivoted to said frame beneath said lifting boom, a prime mover, a high speed shaft and a low speed shaft rotatively mounted in said frame parallel to each other, means for driving said shafts from said prime mover, a drum rotatively mounted on each of said shafts, a scoop, means for supporting and carrying said scoop on said carrying boom, an outhaul cable for moving said scoop out and beyond said boom, said outhaul cable being connected to said high speed drum, an inhaul cable for moving said scoop toward and into engagement with said carrying boom, said inhaul cable being connected to said low speed drum, friction devices for throwing either of said drums into and out of operative relation with their respective shafts, an auxiliary drum for each of said shafts, a cable for raising, lowering and supporting said lifting boom, said cable being connected to one of said auxiliary drums, a cable for elevating and lowering said carrying boom relative to said lifting boom, the last said cable being connected to the other one of said auxiliary drums, and means for throwing either of said auxiliary drums into and out of operative relation to its respective shaft.

11. A wheel supported truck, driving means for advancing said wheel supported truck, a supporting frame pivoted for rotation on said truck, a prime mover on said supporting frame, means operated from said prime mover for swinging said supporting frame relative to said truck, and means for throwing the last said means into operation with said driving means, whereby said truck may be advanced at a speed different from that produced by the first set of driving means.

12. An excavator frame, a prime mover on said excavator frame, a boom carried by said frame, a scoop, an outhaul cable device for moving said scoop from and beyond said boom, an inhaul cable for moving said scoop toward said boom, means connected with said prime mover for operating the outhaul cable, means connected with said prime mover for operating said inhaul cable, the scoop being designed to engage said boom and be carried thereby when moved to its inner limit of movement, and means for automatically throwing the means which controls the inhaul cable out of operative relation with said prime mover when the scoop has engaged the boom.

Des Moines, Iowa, July 13, 1921.

GEORGE T. RONK.